United States Patent Office 3,386,632
Patented June 4, 1968

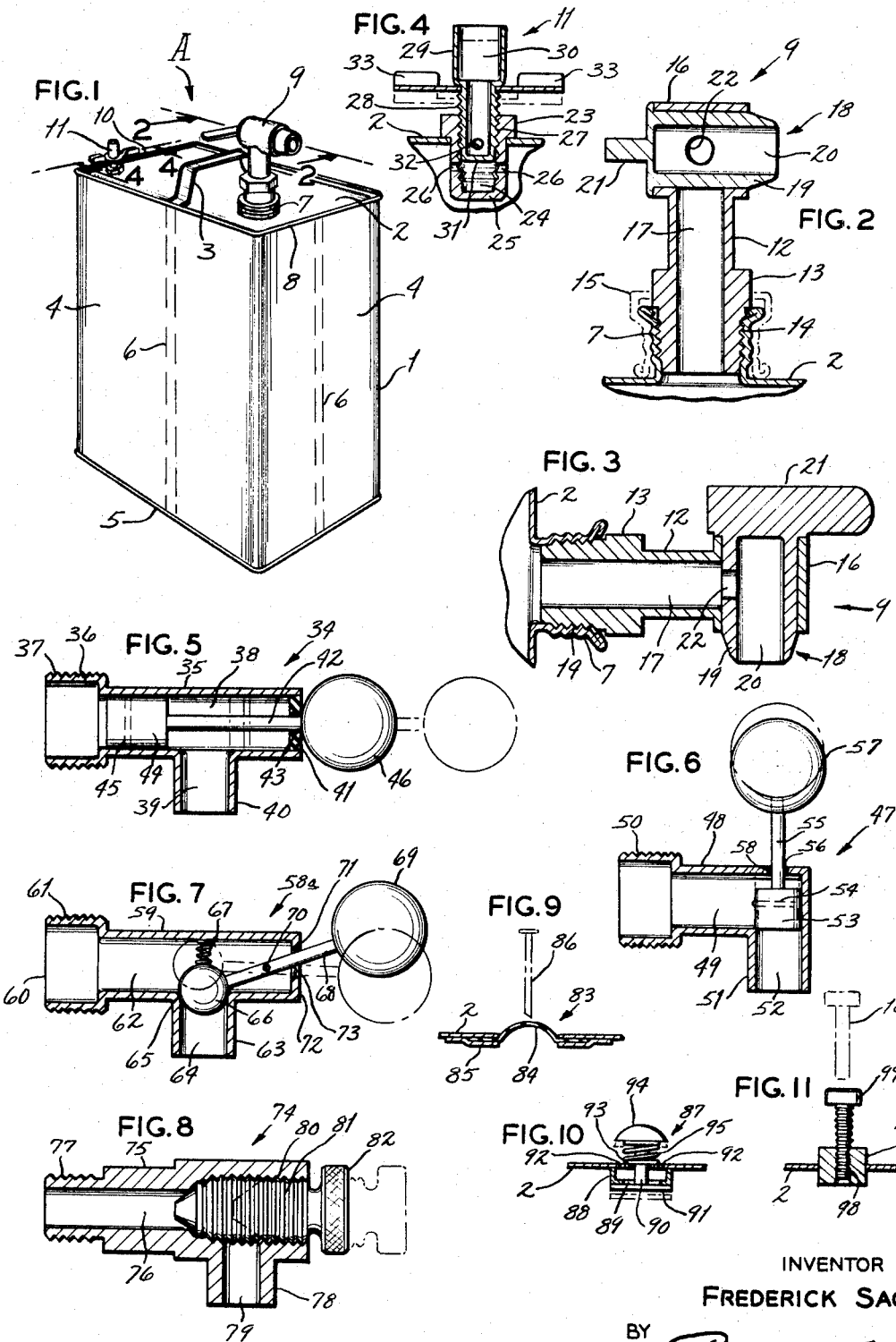

3,386,632
CONTAINER PROVIDED WITH A VENT AND SPOUT ASSEMBLY
Frederick Sager, 427 Belleview Ave.,
Alton, Ill. 62002
Filed Nov. 7, 1966, Ser. No. 592,383
2 Claims. (Cl. 222—482)

ABSTRACT OF THE DISCLOSURE

A dispensing unit including a container having a removable dispenser attached to one wall along an edge thereof, and a valve member connecting to said wall near the opposite edge. Both the dispenser and valve may be manipulated open to facilitate pouring of the container liquid. The unit may be constructed of a plastic-like material to enhance its utility.

---

This invention relates in general to a dispersing unit, and more particularly pertains to an improvement in dispensing of liquids from a standard container.

It is the principal object of this invention to equip a standard fluid or liquid container with a readily accessible and easily operable apparatus for providing removal and discharge of the liquid enclosed within said container.

It has become of recent interest in the various beverage industries to package and sell in bulk various potable liquids that conveniently furnish the consumer with a reasonably sufficient quantity of beverage for a length of time. For example, the beer industry has long packaged and supplied draught beer in bulk kegs to the retail market primarily for the purpose of satisfying the need for a large quantity of this beverage particularly at gatherings where many people are assembled. Recently, and in accordance with the principle of packaging draught beer in keg fashion, this industry has provided for the market and ultimately for consumer usage a reduced size keg for holding an ample quantity of beer, and which may be conveniently disposed within any home refrigeration unit for the purpose of providing a ready supply of beer for members of a residence and for a reasonable length of time. The companion beverage industries that distribute the various sodas and related beverages have not as yet followed the practice of the brewery industry in marketing products in a unit that may be adapted to home usage for providing for rapid and sustained dispensing of its contents, but it is very likely that the market for such convenience products is available, and is only a matter of time that such will be exploited. One major drawback with present day liquid discharging containers incorporating dispensers is that they are exceedingly expensive to manufacture, resulting in an excessive marketing cost. In addition, the retailer has found other uses for such dispensing units after their contents have been depleted, effecting a failure of the manufacturer and processer to achieve a substantial return of the emptied units for refilling and eventual resale. Various business methods have been devised to rectify this problem such as to require that the retailer furnish a token deposit upon the container simultaneously with the purchase of the product, hoping that the purchaser will reclaim his deposit money by returning the emptied container. In practice, the procedure has not been very effective because the type of containers presently utilized in the beverage industry are quite expensive to manufacture, at a cost far in excess of any deposit money, resulting in the purchaser finding it more profitable to retain the container for other uses while sacrificing the cost of the deposit.

Another problem confronting one utilizing the presently available dispensing units is that the means for releasing the packaged liquids are not usually readily accessible, so that when the present containers are positioned within the refrigerator, the various despensers and accompanying valves provided for the release of the beverage are not conveniently disposed for ease of handling. One desiring to release some of the contents of the container must remove the entire dispensing unit from the refrigerator to accomplish the same. It can be seen, then, that it is desirable to provide a unit that may be compactly inserted within a refrigerator and have its dispenser and valve members readily accessible so that beverages may be emptied from the container without necessitating its removal.

It is another object of this invention to provide a dispensing unit that may be conveniently set within a refrigerator and which provides for ready accessibility of its attached dispenser and valve members for insuring easy release of the enclosed beverage.

It is a further object of this invention to provide a liquid container as used in combination with various novel dispensers, which combination is relatively inexpensive in construction as compared with comparable present day type dispensing units.

It is an additional object of this invention to provide a dispensing unit which comprises in combination a relatively standard type container and a removable dispenser.

It is still another object of this invention to provide dispensers that may be used in combination with a standard container and which are easily operated as when it is desired to discharge the fluid retained within said container, but which are structurally sound in construction for preventing further release or leakage of fluid after said dispensers are manipulated into closure.

It is still a further object of this invention to provide dispensers which may be used in conjunction with a standard container and which together comprise a compact package that requires only a small amount of refrigerating space when utilized.

It is yet another object of this invention to provide a liquid dispensing container unit which is pleasing in appearance, readily marketable, and reasonably economical to fabricate.

The foregoing and other objects of this invention are achieved through the usage of variously constructed and easily operative compact dispensers which may be used in conjunction with a relatively inexpensive standard container such as the common one gallon containers. Such containers are readily available from neumerous marketing sources, and are relatively inexpensive in cost since they are manufactured in abundance for use in a wide variety of industries. The particular container, such as revealed in the accompanying drawings, is usually made having a pour spout and closure cap provided in its top wall, said closure cap normally threadedly engaging with the spout means for providing closure to its orifice. For this reason, a dispenser constructed in accordance with the principles of this invention and which possesses inherent means for its ready attachment to the foregoing type container furnishes a combination that may be used for holding a variety of liquids, preferably beverages, which may be conveniently discharged for usage as needed. A container prepared in this manner is relatively inexpensive in construction as compared with similar present day devices, and can be marketed for ready usage by the consumer either in the home or at other private festivities. The dispensers as revealed in this invention for use in conjunction with the foregoing standard container may be easily connected, when desired, to said container, and the combination accomplish its function through a relatively minor manual adjustment of said dispensers. These easy to use dispensers when combined with this type container imparts to the entire unit a form of compactness, allowing for its usage in even a rather confined and small area, as for example, in the crowded refrigerator or other cooling unit, without the needless waste of space as is caused in the use of the presently available type of beverage dispensing units. When this invention is used to hold a noncarbonated type of beverage, or where the beverage is not filled under pressure, a valve member may be added to the same wall of the container to which the dispenser connects, so that to facilitate pouring of said beverage, the conveniently disposed valve may be opened simultaneously with said dispenser. By placing the valve member on the same wall of the container to which the dispenser connects, leads to further compactness of the device, and facilitates its usage, since both the dispenser and valve are closely arranged rather proximate to each other upon the same wall of the container facing towards its user.

The dispensers as revealed in this invention are constructed to operate under the principle that the easiest and the least amount of exertion and effort required to effect their opening and closing, the more desirable they will be to the ultimate user. For this reason, the dispensers are constructed with a plurality of chambers that coact with each other to either release or restrain the enclosed liquid, or further incorporates integrally some form of a closure element which necessitates only slight movement by fingertip control to accomplish the foregoing objects. The essence of the invention is to provide a dispensing unit which is facilely operable, and which may be cheaply constructed under present day manufacturing operations so that their cost will not constitute a substantial percentage of the market value of the final product when it is packaged and made available to the retail trade.

Other features and advantages of this improved dispensing unit may become apparent to those skilled in the art when the following specification is read in conjunction with the accompanying drawings.

In the accompanying drawings:

FIGURE 1 is a perspective view of the dispensing unit;

FIGURE 2 is a cross sectional view of the dispenser taken on line 2—2 of FIGURE 1;

FIGURE 3 is a cross sectional view of the dispenser of FIGURE 2 arranged in open position providing for release of liquid;

FIGURE 4 is a cross sectional view of the valve member taken on line 4—4 of FIGURE 1;

FIGURE 5 is a cross sectional view of a modified dispenser, with a broken-line outline of the closure element disposed in open position;

FIGURE 6 is a cross sectional view of a modified dispenser, revealing a broken-line outline of the closure element disposed in open position;

FIGURE 7 is a cross sectional view of a modified dispenser, with a broken-line outline of the closure element pivoted into open position;

FIGURE 8 is a cross sectional view of a modified dispenser, with a broken-line outline of the closure element partially withdrawn;

FIGURE 9 is a sectional view of a modifier valve member, with a broken-line outline of means for piercing said valve;

FIGURE 10 is a cross sectional view of a modified valve member; and

FIGURE 11 is a cross sectional view of a modified valve member.

The invention may be more accurately visualized by referring to FIGURE 1, wherein is revealed a perspective of a dispensing unit A, comprising a standard liquid container 1 having attached to its upward top wall 2 a handle 3 which is contoured and bent so as to facilitate the grasping and retention by one making use of the dispensing unit. The liquid container 1 is of a common variety which is manufactured rather cheaply and in large quantities for use in various industries. This type of container is normally rectangular in configuration and is constructed, in addition to having a top wall 2, to also include a plurality of side walls 4, and a bottom wall 5. The containers are generally manufactured in one or two gallon capacities, and due to their being constructed in great quantities are reasonably inexpensive in cost. Since the containers are constructed in a rectangular configuration, they may easily rest upon their side walls 4, which preferably may be done during usage of this invention as when it is desired to place the dispensing unit A into a refrigerator readily disposed for providing a rapid and periodic dispensing of the liquids contained therein, all accomplished without removal of the unit from its station in said refrigerator. When the liquids, such as a corbonated beverage, are inserted into the container under pressure, the strength of the container may be enhanced during construction by the addition interiorly to the walls 4 of reinforcing members 6. These reinforcing members may be constructed of angle iron, or any other form of bracing material of high strength which will increase the integral constructive strength of the container. Connecting to the top wall 2 of the container is a pour spout 7 which has molded integrally into it a series of threads which usually accommodate a cap (not shown) which becomes useful such as when it is desired to transport and ship the filled container. There is revealed mounted upon the pour spout 7, proximate the marginal edge 8 of the container, a dispenser 9, said dispenser threadedly engaging with the former so as to provide an integral unit in combination with the container and provide a means for discharging its internally contained liquid when desired. Also connecting to the top wall 2 of the container, proximate the marginal edge 10, is a valve member 11 which may be adjusted either into opening or closure so as to provide and facilitate during discharge of liquid from the container, the entrance of air into said container. It should become apparent that the invention, as revealed in FIGURE 1, provides an integrated dispensing unit which is economical and compact in construction, yet provides the ultimate of convenience in the dispensing of liquids. In usage, the standard container may be filled with any potable liquid by a processor, then capped and sold upon the market either in the form as shown, or with the dispenser and valve already connected thereto. In the latter case, one need only insert the entire dispensing unit into the refrigerator for resting upon one of its side walls 4, with said valve and dispenser disposed to the frontal portion of the refrigerator directed towards its user, unobstructed for ready operation and utilization. Conceivably, the dispenser 9 and valve 11 may be inserted by the purchaser himself as when it is desired to prepare the unit for usage, in which case, the container as filled with a beverage may be capped and sold without the foregoing attached, which consequently achieves better preservation of the enclosed beverage.

The dispenser 9 of the invention is more clearly revealed in FIGURES 2 and 3, wherein it is shown as threadedly engaging with the spout 7 which connects integrally with the top wall 2 of the container. The dispenser is comprised of a tubular portion 12 which has an enlarged portion 13 formed proximate one end, with said portion having threads, as at 14, so as to accommodate the threaded portion of the pour spout 7. A shielding cap 15 may be provided connecting to portion 13 and engage exteriorly of the spout 7 to further enhance the seal at this area when the dispenser is attached to the container. Provided integrally with the other end of the tubular portion 12 is a sleeve like member 16, said sleeve having a longitudinal axis approximately perpendicular with the axis of the tubular portion 12. The tubular portion 12 has an internal conduit 17 disposed centrally longitudinally through its interior, and when the dispenser 9 is appropriately engaged upon the container 1, said conduit is in open communication with the interior of the container.

Positioned within the sleeve like member 16 is a nozzle 18 which is comprised of a tubular member 19 having an opening 20 centrally within its interior. The nozzle 18 is tightly disposed within the sleeve 16, but when a sufficient turning force is exerted upon an integral handle 21, said nozzle may be rotated with respect to said sleeve. An aperture 22 is provided through the tubular portion 19 of the nozzle, and when the dispenser is maintained open, as shown in FIGURE 3, the aperture 22 will be properly aligned with the conduit 17 and opening 20 so as to provide a continuous passageway through which the liquid within the container may pass and be discharged out of the nozzle for usage. But, when the nozzle 18 is turned, through the exertion of a force exerted upon the handle 21, and is disposed as revealed in FIGURE 2, the aperture 22 will abut against the interior of the sleeve member 16, with the solid tubular portion 19 providing a closure for the conduit 17. When the dispenser is adjusted as in this manner, the liquid will be restrained against discharge out of the container 1 and conduit 17. It can readily be seen that the dispenser 9 may be easily adjusted into open or closed positioning by the simple exertion of a manual force upon the handle 21 of nozzle 18, and by either adjustment may release or restrain the passage of the fluids out of the container 1.

Referring to FIGURE 4, there is revealed the valve member 1, in its attachment with the top wall 2 of the container 1. The function of the valve member 11 is to provide for the admission of air into the container simultaneously as the dispenser releases liquid from the same. In construction, the valve member comprises a mount 23 which is rigidly, permanently connected to the top wall 2 of the container, said mount having an opening 24 provided centrally partially therethrough. The downward end of the mount has an integral closure 25 which consequently seals off the bottom end of the opening 24. There are provided through the sides of the mount 23 a pair of axially aligned apertures 26 which provide for communication between the opening 24 and the interior of container 1. The inner surface of the mount 23 is provided with threads 27, which intermesh with the external threads 28 of an air inlet tube 29. The tube 29 has an opening 30 disposed centrally therethrough, with the downward end of said tube having a bottom wall 31 providing closure for this end of the tube opening. A pair of apertures 32 are provided through the tube 29 proximate its end wall 31, and since that tube is rotatable with respect to the mount 23, a limited rotation of the tube will provide for alignment of the apertures 32 with the apertures 26 of mount 23. To facilitate the rotation of tube 29 there are provided a pair of finger grips 33 that project radially from the tube 29. When it is desired to provide an opening for air through the valve member 11 and into the interior of container 1, one need simply to rotate the inlet tube 29 with respect to mount 23 until the plurality of apertures 26 and 32 achieve alignment. To close the valve member simply requires a reverse rotation of tube 29 until apertures 32 become unaligned with respect to the apertures 26, thereby precluding the passage of air through the apertures 26 and into the interior of the container. The adjustment of this valve member is easily performed, necessitating only a minor manipulative effort, by the hand, of the inlet tube 29 with respect to the mount 23.

A further modification in a dispenser 34 is revealed in FIGURE 5, and comprises a tubular portion 35 having a slightly enlarged end 36 being externally threaded, as at 37, so as to provide for engagement with pour spout 7 of the container 1. Provided centrally through the tubular portion 35 is a central conduit 38, and said conduit is in open communication with an opening 39 provided within the nozzle 40 that projects integrally from the foregoing tubular portion. The other end of said tubular portion is provided with closure by means of a plug 41, said plug having an aperture provided centrally therethrough wherein a rod 42 inserts. A gasket 43 is provided intermediate the plug 41 and rod 42 so as to provide a liquid seal for preventing any seepage of fluid at this juncture. Disposed within the conduit 38 of the dispenser is a closure element 44, said element having an external diameter slightly less than the internal diameter of said conduit To further prevent the undesirable leakage of fluid past the closure element 44, there is provided around its exterior a sealing ring 45, with said ring being compressively contiguous against the inner surface of tubular portion 35. This closure element 44 connects to one end of the rod 42, with the other end of said rod affixing to a gripping member 46 which is permanently disposed externally of the tubular portion 35. When the closure element is maintained in the position as revealed in FIGURE 5, the fluid in the container 1 will be preevnted from passing through the dispenser 34, and from being dicharged from its integral nozzle 40. But, when the gripping member 45 and its connected rod 42 are withdrawn out from the tubular portion 35, as revealed in the broken-line outline, the connected closure element 44 will likewise shift into approximate contact with the end of the tubular portion nearest the plug 41. When maintained in this position, it can readily be seen that the fluid within the container 1 will be free to pass through conduit 38 and opening 39 and be discharged from the dispenser.

The dispenser 47, as revealed in FIGURE 6, is quite similar in principle to the dispenser just previously discussed, and is comprised of a tubular portion 48, having a conduit 49 provided centrally therethrough, with said tube engaging by means of its threaded end 50 with the pour spout of a standard container. A nozzle 51 having a central opening 52 therein is integral with the foregoing tubular portion 48, and when the dispenser is opened provides for a continuous passageway for the fluid to travel out of the attached container, and through said conduit 49 and the opening 52 for its discharge. A closure element 53 is longitudinally disposed within the nozzle 51, and when maintained in closure normally precludes discharge of any of the foregoing fluid. To render the dispenser more efficient and to prevent any unwanted seepage of fluid, there is provided around the element 53 a sealing ring 54 which compressively engages against the interior of the nozzle 51. Connecting with the closure element 53 is a rod 55 which projects through an aperture 56 provided in the tubular portion 48, and connecting to the opposite end of said rod is a gripping member 57 which is properly disposed for ease of grasping to facilitate opening or closing of the dispenser. A gasket 58 is disposed intermediate the rod 55 and the aperture wall 56 so as to prevent any seepage of the contained liquid out of the dispenser at this point. To open the dispenser and thereby provide for a discharge of fluid out of the container, this arrangement more specifically shown in the broken-line outline, one need simply to elevate the gripping member 57 and its connected closure element 53 to provide for an open communication between the conduit 49 and opening 52 of the dispenser. To prevent a further release of any fluid, simply necessitates a forcing downwardly of the gripping member 57, which effectuates a lowering of the closure element 53 into the nozzle 51, thereby precluding discharge of the container liquid.

A further modification of a dispenser 58a, is revealed in FIGURE 7, and is comprised of a tubular portion 59 having an expanded end 60 which contains integral threads 61 to provide for its connection with the spout 7 of a standard container. Provided interiorly of the tubular portion 59 is a conduit 62 which is in open communication with the interior of the foregoing container. Projecting integrally from the aforesaid tubular portion is a nozzle 63 which has an interior opening 64 through which the various fluids of the container may be discharged when the dispenser 58a, is maintained open. The internal juncture between the nozzle 63 and tubular portion 59 forms a valve-like seating arrangement 65 upon which the spherical closure element 66 may rest when the dispenser is maintained in closed position. A spring 67 is disposed intermediate the top portion of the foregong closure element 66 and the inner surface of the tubular portion 59 and is provided for normally biasing the closure element into contiguous contact upon the valve seat 65. Connecting to the closure element 66 is one end of a rod 68, with the other end of said rod projecting outwardly of the tubular portion and connecting with a gripping member 69 which is conveniently disposed to provide for ready manipulation of the dispenser either into opening or closure. The functioning of this dispenser is effected by the cooperative and simultaneous pivotal motion of the closure element 66 by manipulation of the gripping member 69, and to provide this form of motion the rod 68 is pivotally connected by means of a pin 70 to the sides of the tubular portion 59. The rod 68 projects externally of the tubular portion 59 through an aperture 71 provided through the partially closed end 72 of said tubular portion. To prevent any undesirable seepage of fluid out of the dispenser and through the aperture 71, there is provided a sealing gasket 73 intermediate the closed end 72 and rod 68, covering the entire aperture 71, said gasket having sufficient flexibility so as to provide for its contraction or expansion as the foregoing rod is vertically shifted. The dispenser 58a, is maintained closed to prevent discharge of fluid when the gripping member 69 is freed and the closure element 66 under the bias of spring 67 enters into contiguous contact with the valve seat 65. By depressing the gripping member 69 downwardly, as revealed in the broken-line outline, there is effected a pivoting of the closure member 66 upwardly against the bias of spring 67, and it can be readily seen that an open communication is thereby provided between the conduit 62 and the opening 64, providing a passageway through which the liquid in the associated container may be discharged.

The dispenser member 74, as revealed in FIGURE 8, shows an additional modified structure that may provide for restraint or discharge of fluid from a connected container. The dispenser is comprised of a tubular portion 75 which has a central conduit 76 provided therethrough. One end of the tubular portion is threaded, as at 77, and allows for connection of the dispenser to a pour spout 7 of a container. Connecting integrally with the tubular portion 75 is a nozzle 78 which has an opening 79 provided therethrough, and when said dispenser is maintained open for discharge of fluid the foregoing conduit 76 will be in open communication with the opening 79 to provide a continuous passageway for release of fluids. Provided proximate one end of the tubular portion of the dispenser are interior threads, as at 80, and said threads are conveniently arranged so as to accommodate the threads of a closure member 81 which may be rotatably inserted for threaded engagement within the interior of the tubular portion of the dispenser. It is to be noted that the threads 80 extend inwardly past the opening 79 of nozzle 78, so that when the closure element is fully inserted into said tubular portion, the conduit 76 will be closed and thereby prevent passage of any fluid to the nozzle. Contrariwise, when the closure element is partially withdrawn, as shown in the broken-line outline, both the opening of the nozzle 78, and the foregoing conduit will be in open communication for providing discharge of fluid. To facilitate the insertion or removal of the closure element from within the tubular portion of the dispenser, one end is provided with a knurled knob 82, which may be easily grasped and tenaciously held during turning of said closure element.

A modified form of a valve member 83 is revealed in FIGURE 9, and comprises a portion of impervious, but cutable, material 84 which is secured to cover an aperture provided in the top wall 2 of a container. A fastening ring 85 holds said portion of material rigidly in place. When it is desired to provide for the admission of air into the container as during the discharge of its fluid, any form of sharp instrument or object, such as shown at 86, can be utilized for piercing the foregoing material to effect its perforation. Usage of such a valve member is desired when it is necessary to acquire rapid admission of air into the container for facilitating discharge of its fluid, and when it is known that the entire fluid contents will be rapidly consumed in a reasonably short period of time.

FIGURE 10 reveals another valve member 87 that may be used in conjunction with a standard container for the purpose of accomplishing the objects of this invention. The valve member comprises a frame member 88 that is ragidly secured to the underside of the top well 2 of the container. Frame 88 has an aperture 89 provided through its downward surface, and disposed through the aperture is a stem 90 that has connected to its downward end a plate 91. It is to be noted that the stem 90 is substantially smaller in diameter than the diameter of the aperture 89 so that when plate 91 is displaced away from the downward surface of the frame 88, there will be provided a spacing intermediate said frame through which air may freely pass. There are a plurality of apertures, such as revealed at 92, in the top wall 2, which provide for the admission of external air into the interior of the container and through the aperture 89 of frame 88. The stem 90 projects outwardly of the upper wall 2 of the container through an opening 93, and connected to the upward end of the stem is a push button 94. A spring 95 normally biases the push button upwardly of the top wall 2 and in such fashion normally retains the plate 91 tightly contiguous against the bottom of the frame member 88 resulting in a hermetic sealing of the aperture 89. But, when the push button 94 is depressed, as revealed in the broken-line outline, and overcomes the bias of spring 95, the plate 91 will be displaced from the member 88 and provide for the passage of air through apertures 92 and 89 into the interior of the container, thereby facilitating and providing for a more continuous discharge of the fluid through the dispenser and out of the container.

FIGURE 11 reveals a further modification of a valve member 96 which is comprised of a mount 97 having internal threads 98, with said mount being connected to the top wall 2 of a container. A screw 99 may be threadedly engaged within the mount 97, as when it is desired to close the valve member, but that said screw may be withdrawn, as shown at 100, when desired to provide for the unrestricted admission of air through the mount 97 and into the container.

The foregoing dispensers and modifications of dispensers, and valve members and modifications of valve members, all function in conjunction with a standard container to provide an integrated dispensing unit that is inexpensive to manufacture and highly convenient for common household usage. The various dispensers and valve members are constructed in such a manner so that they may be easily utilized by everyone, and through their modification will provide for either continuous dispensing of liquid from the container and steady admission of air therein without constant supervision by its user, or they will provide for only periodic dispensing and admission of air into the container by the personal action of its user. The invention is compact in assembly, and fills a need which is presently lacking in the liquid dispensing field. To further add to the characteristic of convenience inherent in the construction of this dispensing unit, the entire container may be fabricated from an inexpensive metal, plastic or similar material and be discarded after its contained liquids have been consumed. Throw-away-items appear to be presently in vogue, and to incorporate such a feature into this dispensing unit will further enhance its saleability, while eliminating the high cost factor and inconvenience associated with presently available units.

It is to be understood that the above described invention is merely illustrative of the application of its principles, and other designs may be readily devised by those skilled in the art which may embody the teachings of the invention and be included within its spirit and scope thereof.

Having thus described the invention, what is claimed and desired to be secured by Letters Patent is:

1. In a fluid container having a capacity to hold a definite quantity of liquid, said container having integral side, bottom, and top walls, a pour spout integrally connecting with one of said walls proximate a marginal edge of said wall, wherein the improvement comprises, a dispenser attached to said spout, said dispenser being adjustable into open or closed disposition providing for discharge or restraint of flow of the liquid from said container, a valve member connecting to said wall proximate its opposite marginal edge, said valve member comprising a mount connecting to said wall of the container, said mount having a central opening therein, the inner surface of said mount being threaded, said mount having a pair of apertures provding for communication between said mount opening and the interior of the container, a tube threadedly engaging with said mount threads, means connecting with said tube to provide support for its turning, said tube having a pair of apertures capable of disposition in axial alignment with said mount apertures and providing an inlet for admission of air into the container, and said tube disposed for turning to effect disalignment of said apertures to prevent further entrance of said container, said container when disposed on one of its sides in a fluid flowing position and with the dispenser and valve member opened providing for discharge of the container liquid from said dispenser while simultaneously providing for the admission of air into said container by means of the valve member.

2. The fluid container as defined in claim 1 and further characterized by said container and dispenser being formed of a plastic-like material.

References Cited

UNITED STATES PATENTS

| | | | |
|---|---|---|---|
| 230,885 | 8/1880 | Mason et al. | 222—482 |
| 829,695 | 8/1906 | Dennis | 251—351 |
| 1,176,653 | 4/1916 | Chow | 222—482 |
| 1,203,687 | 11/1916 | Bemis | 222—482 |
| 1,678,927 | 7/1928 | Weatherhead | 251—351 |
| 1,903,915 | 4/1933 | Smith. | |
| 2,080,602 | 5/1937 | Chamberlain | 222—481 X |
| 2,529,275 | 11/1950 | Blumer et al. | 222—481 X |
| 2,816,695 | 12/1957 | Dagenais | 222—481 |
| 3,064,668 | 11/1962 | Alkire et al. | 222—482 X |
| 3,258,178 | 6/1966 | Gran | 222—482 |

WALTER SOBIN, *Primary Examiner.*

UNITED STATES PATENT OFFICE
CERTIFICATE OF CORRECTION

Patent No. 3,386,632                         June 4, 1968

Frederick Sager

It is certified that error appears in the above identified patent and that said Letters Patent are hereby corrected as shown below:

Column 1, line 21, "dispersing" should read -- dispensing --. Column 6, line 7, after "conduit" insert a period. Column 10, line 3, "of said" should read -- of air into said --.

Signed and sealed this 9th day of December 1969.

(SEAL)
Attest:

Edward M. Fletcher, Jr.
Attesting Officer

WILLIAM E. SCHUYLER, JR.
Commissioner of Patents